(12) United States Patent
Huang et al.

(10) Patent No.: US 11,006,330 B2
(45) Date of Patent: May 11, 2021

(54) METHOD AND APPARATUS FOR CONFIGURING NEIGHBOR CELLS, AND STORAGE MEDIUM

(71) Applicant: CLOUDMINDS (SHANGHAI) ROBOTICS CO., LTD., Shanghai (CN)

(72) Inventors: William Xiao-Qing Huang, Shenzhen (CN); Zhenkai Wang, Shenzhen (CN); Haitao Jiang, Shenzhen (CN)

(73) Assignee: CLOUDMINDS (SHANGHAI) ROBOTICS CO., LTD., Shanghai (CN)

( * ) Notice: Subject to any disclaimer, the term of this patent is extended or adjusted under 35 U.S.C. 154(b) by 0 days.

(21) Appl. No.: 16/550,275

(22) Filed: Aug. 25, 2019

(65) Prior Publication Data
US 2019/0387439 A1  Dec. 19, 2019

Related U.S. Application Data

(63) Continuation of application No. PCT/CN2017/103811, filed on Sep. 27, 2017.

(51) Int. Cl.
*H04W 36/00* (2009.01)
*H04W 4/44* (2018.01)
*H04W 4/029* (2018.01)
*H04W 36/08* (2009.01)
*H04W 36/26* (2009.01)

(52) U.S. Cl.
CPC ....... *H04W 36/0061* (2013.01); *H04W 4/029* (2018.02); *H04W 4/44* (2018.02); *H04W 36/0094* (2013.01); *H04W 36/00835* (2018.08); *H04W 36/08* (2013.01); *H04W 36/26* (2013.01)

(58) Field of Classification Search
None
See application file for complete search history.

(56) References Cited

U.S. PATENT DOCUMENTS 9,537,561 B1 * 1/2017 Kotecha .................. H04W 8/00
2013/0150034 A1  6/2013 Kondo
(Continued)

FOREIGN PATENT DOCUMENTS

| CN | 101500293 A | 8/2009 |
|---|---|---|
| CN | 102378247 A | 3/2012 |

(Continued)

OTHER PUBLICATIONS

Supplementary European Search Report for the corresponding EU patent application No. EP17926431.2, dated Jan. 8, 2020, 10 pages total.

(Continued)

*Primary Examiner* — Anh Vu H Ly
(74) *Attorney, Agent, or Firm* — Morgan, Lewis & Bockius LLP

(57) ABSTRACT

A method and apparatus for configuring neighbor cells, and a storage medium are provided. The method comprises: determining neighbor cell information, and sending the neighbor cell information to a terminal, the neighbor cell information being configured to instruct the terminal to determine neighbor cells corresponding to a height level or height range at which the terminal is located.

16 Claims, 8 Drawing Sheets

Determine neighbor cell information — S101

Send the neighbor cell information to a terminal, the neighbor cell information being configured to instruct the terminal to determine neighbor cells corresponding to a height level or height range at which the terminal is located — S102

(56) References Cited

U.S. PATENT DOCUMENTS

| | | | |
|---|---|---|---|
| 2015/0126193 A1 | 5/2015 | Huang et al. | |
| 2016/0157165 A1 | 6/2016 | Xie et al. | |
| 2017/0240293 A1 | 8/2017 | Repp et al. | |
| 2018/0139074 A1* | 5/2018 | Hong | H04W 36/28 |
| 2018/0375568 A1* | 12/2018 | De Rosa | H04W 72/04 |
| 2019/0166516 A1* | 5/2019 | Kim | H04W 24/10 |
| 2020/0033849 A1* | 1/2020 | Yiu | H04B 7/18506 |
| 2020/0120563 A1* | 4/2020 | Tak Cs | H04W 16/18 |
| 2020/0187031 A1* | 6/2020 | Kazmi | H04W 52/245 |
| 2020/0213891 A1* | 7/2020 | Hong | H04W 36/0083 |
| 2020/0220612 A1* | 7/2020 | Thomas | H04B 7/18502 |
| 2020/0236573 A1* | 7/2020 | Zhang | H04W 24/10 |
| 2020/0236602 A1* | 7/2020 | Mahkonen | H04B 7/18506 |

FOREIGN PATENT DOCUMENTS

| | | |
|---|---|---|
| CN | 103141135 A | 6/2013 |
| CN | 103167566 A | 6/2013 |
| CN | 103313188 A | 9/2013 |
| CN | 103595457 A | 2/2014 |
| CN | 103606261 A | 2/2014 |
| CN | 103945423 A | 7/2014 |
| CN | 107205225 A | 9/2017 |
| JP | 2002199428 A | 7/2002 |
| JP | 2007082195 A | 3/2007 |
| JP | 2010109664 A | 5/2010 |
| JP | 2010273114 A | 12/2010 |
| JP | 2012060342 A | 3/2012 |
| JP | 2017091775 A | 5/2017 |
| JP | 2009278450 A | 11/2019 |
| WO | 2014/012255 A1 | 1/2014 |
| WO | WO 2015120724 A1 | 8/2015 |

OTHER PUBLICATIONS

Communication Pursuant to Article 94 (3) EPC, EP 17926431.2, dated Oct. 19, 2020, 7 pgs.
Office Action, JP Application No. 2019-553858, Dec. 15.
Office Action, CN Application No. 201780001963.5, dated Jul. 3, 2020, 13 pgs.

* cited by examiner

Neighbor cell information receiving module 1101

Third neighbor cell determination module 1102

US 11,006,330 B2

METHOD AND APPARATUS FOR CONFIGURING NEIGHBOR CELLS, AND STORAGE MEDIUM

CROSS-REFERENCE TO RELATED APPLICATIONS

The application is a continuation application of PCT application No. PCT/CN2017/103811 submitted on Sep. 27, 2017, which is incorporated herein by reference in its entirety.

TECHNICAL FIELD

The present disclosure relates communication technologies, and in particular, relates to a method and apparatus for configuring neighbor cells, and a storage medium.

BACKGROUND

With the development of unmanned air vehicle (UAV) technologies, UAVs have been applied in the fields of film, media, agriculture, oil and gas monitoring, etc. besides daily life of people. With continuous expansion of the application field, the demand of UAVs for communication is increasingly high.

Neighbor cell configuration of an LTE system is for terrestrial services, and UAVs currently considered in UAV research projects have the highest flight height of 300 meters and the highest horizontal speed of 160 km/h. The existing LTE system base stations have downward inclination angles for terrestrial services, instead of facing the sky for air services. In addition, optimal signal receiving cells of a UAV on different flight heights are greatly different from optimal signal receiving cells of a terminal on the ground, that is, on different flight heights of the UAV, the optimal cell distribution is different from that on the ground. Therefore, if the conventional LTE neighbor cell configuration method for terrestrial services is used, the mobility experience of UAVs can be seriously affected, and the communication of the UAVs can also be affected.

SUMMARY

In order to solve the above problems, the present disclosure provides a method and apparatus for configuring neighbor cells, and a storage medium.

According to a first aspect of some embodiments of the present disclosure, a method for configuring neighbor cells is provided, applied to a network device, including: determining neighbor cell information, and sending the neighbor cell information to a terminal, the neighbor cell information being configured to instruct the terminal to determine one or more neighbor cells corresponding to a height level or range at which the terminal is located.

According to a second aspect of some embodiments of the present disclosure, a method for configuring neighbor cells is provided, applied to a network control device, including: acquiring a measurement report reported by a measurement device, the measurement report including receiving power or receiving quality values for downlink reference signals or downlink synchronization signals or channel state reference signals of cells to be measured at a location of the measurement device; determining, based on a height value of the location of the measurement device, a height level or range at which the measurement device is located; determining, based on the location of the measurement device and the receiving power or receiving quality values of the measurement device for downlink reference signals or downlink synchronization signals or channel state reference signals of cells to be measured, a cell having optimal quality of service corresponding to the height level or range at which the measurement device is located; determining one or more neighbor cells corresponding to a network device at different height levels or ranges, the network device corresponding to the cell having optimal quality of service; and sending neighbor cell configuration information to the network device based on the determined neighbor cells, the neighbor cell configuration information including neighbor cells corresponding to the network device at different height levels or ranges.

According to a third aspect of some embodiments of the present disclosure, a method for configuring neighbor cells is provided, applied to a terminal, including: receiving neighbor cell information sent by a network device, the neighbor cell information being configured to instruct the terminal to determine neighbor cells corresponding to a height level or range at which the terminal is located; and determining, based on the neighbor cell information, neighbor cells corresponding to a height value of the location of the terminal.

According to a fourth aspect of some embodiments of the present disclosure, an apparatus for configuring neighbor cells is provided, applied to a network device, including: a configuration information determination module, configured to determine neighbor cell information; and a neighbor cell information sending module, configured to send the neighbor cell information to a terminal, the neighbor cell information being configured to instruct the terminal to determine neighbor cells corresponding to a height level or range at which the terminal is located.

According to a fifth aspect of some embodiments of the present disclosure, an apparatus for configuring neighbor cells is provided, applied to a network control device, including: a measurement report acquisition module, configured to acquire a measurement report reported by a measurement device, the measurement report including receiving power or receiving quality values for downlink reference signals or downlink synchronization signals or channel state reference signals of cells to be measured at the location of the measurement device; a first height determination module, configured to determine, based on a height value of the location of the measurement device, a height level or range at which the measurement device is located; an optimal cell determination module, configured to determine, based on the location of the measurement device and the receiving power or receiving quality values of the measurement device for downlink reference signals or downlink synchronization signals or channel state reference signals of cells to be measured, a cell having optimal quality of service corresponding to the height level or range at which the measurement device is located; a second neighbor cell determination module, configured to determine neighbor cells corresponding to a network device at different height levels or height intervals, the network device corresponding to the cell having optimal quality of service; and a configuration information sending module, configured to send neighbor cell configuration information to the network device based on the determined neighbor cells, the neighbor cell configuration information including neighbor cells corresponding to the network device at different height levels or ranges.

According to a sixth aspect of some embodiments of the present disclosure, an apparatus for configuring neighbor cells is provided, applied to a terminal, including: a neighbor cell information receiving module, configured to receive neighbor cell information sent by a network device, the neighbor cell information being configured to instruct the terminal to determine neighbor cells corresponding to a height level or range at which the terminal is located; and a third neighbor cell determination module, configured to determine neighbor cells corresponding to a height value of the location of the terminal based on the neighbor cell information.

According to a seventh aspect of some embodiments of the present disclosure, a computer readable storage medium is provided, the computer readable storage medium including one or more programs for executing the method according to the first aspect.

According to an eighth aspect of some embodiments of the present disclosure, an apparatus for configuring neighbor cells is provided, applied to a network device, including: the computer readable storage medium; and one or more processors for executing the programs in the computer readable storage medium.

According to a ninth aspect of some embodiments of the present disclosure, a computer readable storage medium is provided, the computer readable storage medium including one or more programs for executing the method according to the second aspect.

According to a tenth aspect of some embodiments of the present disclosure, an apparatus for configuring neighbor cells is provided, applied to a network control device, including: the computer readable storage medium; and one or more processors for executing the programs in the computer readable storage medium.

According to an eleventh aspect of some embodiments of the present disclosure, a computer readable storage medium is provided, the computer readable storage medium including one or more programs for executing the method according to the third aspect.

According to a twelfth aspect of some embodiments of the present disclosure, an apparatus for configuring neighbor cells is provided, applied to a network control device, including: the computer readable storage medium; and one or more processors for executing the programs in the computer readable storage medium.

With the above technical solutions, neighbor cell configuration information is determined, and neighbor cell information is sent to a terminal based on the neighbor cell configuration information, the neighbor cell information being configured to instruct the terminal to determine neighbor cells corresponding to a height level or range at which the terminal is located. In this way, the neighbor cells corresponding to the height level or range at which the terminal is located are determined, so that the height location of the terminal is considered during neighbor cell configuration to ensure the communication quality of air services of a UAV and the like.

DETAILED DESCRIPTION

The specific examples of the present disclosure will be described in detail below with reference to the accompanying drawings. It should be understood that the specific examples described herein are merely used for illustrating and interpreting the present disclosure, rather than limiting the present disclosure.

The technical solutions provided in the following examples of the present disclosure may be applied to wireless communication networks, e.g., long term evolution (LTE) systems, long term evolution advanced (LTE-A) systems, and further evolution networks thereof, such as 5G networks.

The wireless communication network may include a network control device, a network device, and a terminal, where the terminal may directly communicate with the network device, the network device reports terminal information to the network control device, the network control device implements the functions of operation, management, maintenance, decision making and the like based on the terminal information, the network device may be a base station (BS), and the base station may be a device that communicates with user equipment or other communication stations such as a relay station. The base station may provide communication coverage for a specific physical region. For example, the base station may be an evolutional node B (ENB or eNodeB) in LTE, or other access network device that provides an access service in the wireless communication network. The network control device may be a network management device configured to perform function configuration on the base station.

In some examples of the present disclosure, for a distributed wireless communication system, the network control device may also be a master serving base station, the network device may also be a slave serving base station, the master serving base station is configured to perform function configuration on the slave serving base station, and the slave serving base station is configured to report relevant information to the master serving base station.

For a 5G network, a CU (Central Unit) and DUs (Distributed Units) may be present, multiple DUs are connected to one CU for central processing, at this time, the network control device may be the CU and the network device may be the DU.

In some examples of the present disclosure, the terminal may be a device flying in the air, e.g., a UAV. In the entire wireless communication network, terminals flying in the air may be distributed in different air regions. The air region may be a regional space consisting of a height level or range and a horizontal interval.

Figure 1:
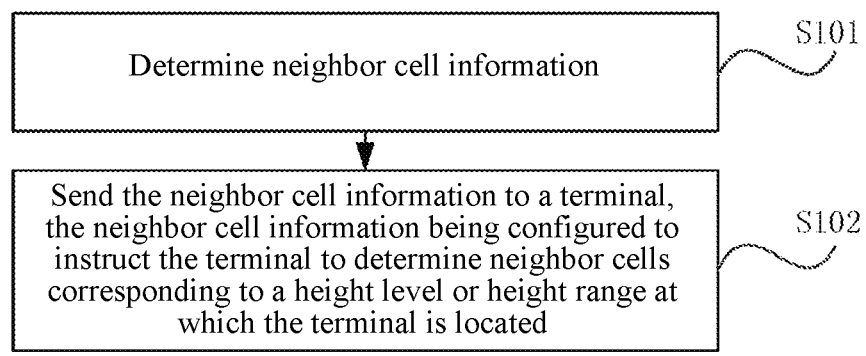
FIG. 1 is a process diagram of a method for configuring neighbor cells according to an example of the present disclosure.

FIG. 1 shows a method for configuring neighbor cells provided by an example of the present disclosure. As shown in FIG. 1, the method may be applied to a network device that directly communicates with a terminal, including:

S101, neighbor cell information is determined.

The neighbor cell information is used to instruct the terminal to determine neighbor cells corresponding to a height level or range at which the terminal is located.

In this step, neighbor cell configuration information sent by a network control device may be received, and the neighbor cell information is determined according to the neighbor cell configuration information.

The neighbor cell configuration information includes neighbor cells corresponding to the network device at different height levels or ranges.

In a possible implementation manner, for an idle terminal, the neighbor cell configuration information is neighbor cell information, and the neighbor cell information is sent later by broadcasting. For a connected terminal, the network device may acquire location information reported by the terminal, determine, based on the location information, a height level or range corresponding to the location of the terminal, and determine, based on the determined height level or range and the neighbor cell configuration information, the neighbor cell information from to-be-measured cell identifiers included in measurement configuration information.

Optionally, the neighbor cell configuration information is characterized by a sequence, and each element in the sequence corresponds to a different height level or range.

S102, the neighbor cell information is sent to a terminal, the neighbor cell information being configured to instruct the terminal to determine neighbor cells corresponding to a height level or range at which the terminal is located.

In this step, for different types of terminals, the network device may send the neighbor cell information in at least one of two modes:

In the first mode, if the terminal is an idle terminal, the network device sends the neighbor cell information by broadcasting, so that the idle terminal determines neighbor cells corresponding to a height level or range at which the terminal is located, and performs cell selection and/or cell re-selection.

In the second mode, if the terminal is a connected terminal, the neighbor cell information may be sent to the connected terminal by dedicated signaling, the neighbor cell information including measurement configuration information, the measurement configuration information including to-be-measured cell identifiers corresponding to a height level or range at which the terminal is located, so that the connected terminal performs mobility measurement and cell handover based on the to-be-measured cell identifiers.

In addition, the measurement configuration information may include further information such as a cycle time of measurement to be reported or a trigger event for measurement.

It should be noted that the two modes may be performed at the same time, so that different sending modes can be used for different types of terminals, or one of the modes is performed for one type of terminal. In one example, only the first mode is performed for optimizing an idle terminal. In another example, only the second mode is performed for optimizing the connected terminal. The present disclosure is not intended to be limited to the above examples.

Optionally, when the terminal is in a connection state, the network device may further receive a digital map of neighbor cell distribution that is sent by the network control device, acquire location information and a moving direction of the terminal, determine, based on the location information and a moving direction of the terminal as well as the neighbor cell configuration information, one or more target neighbor cells corresponding to the moving direction of the terminal from the digital map of neighbor cell distribution, and send neighbor cell information including the target neighbor cells to the terminal.

The neighbor cell distribution digital map includes a location distribution of cells having optimal quality of service corresponding to all regional locations at a same height level or range.

In the above examples, the neighbor cells corresponding to a height level or range at which the terminal is located can be determined, so that the height location of the terminal may be considered during neighbor cell configuration to ensure the communication quality of air services of a UAV and the like.

Figure 2:
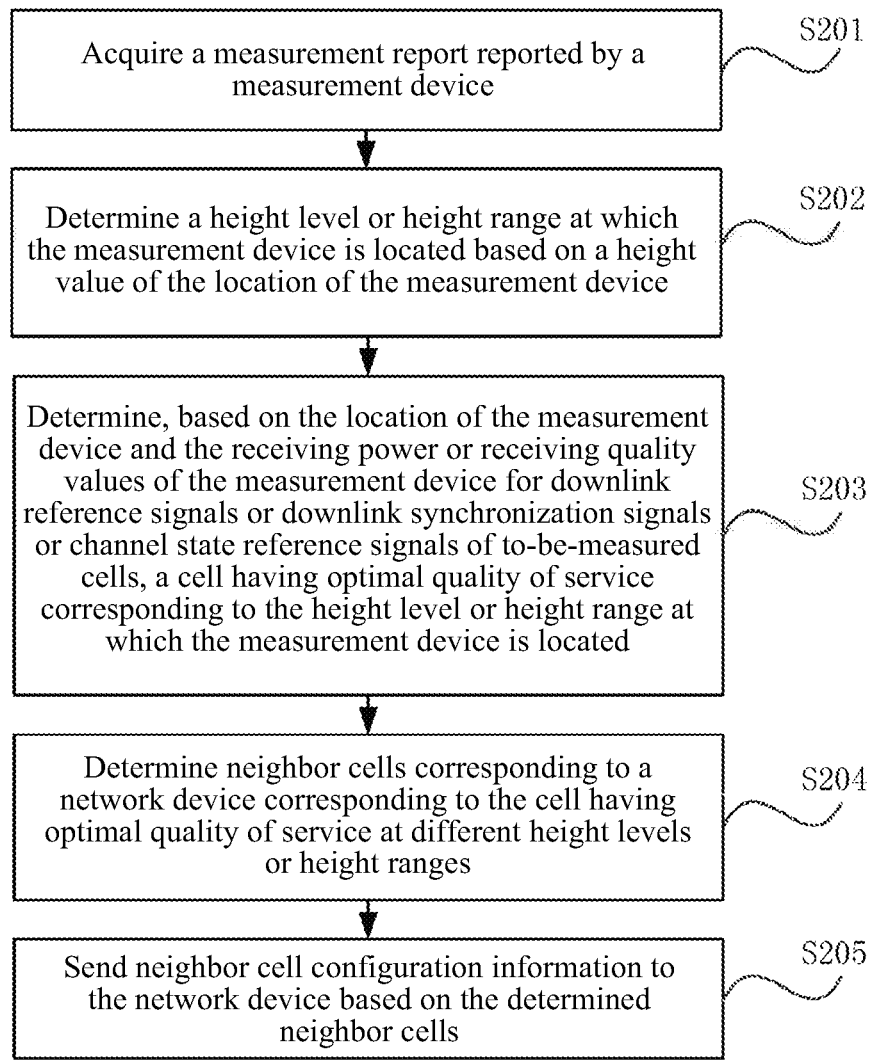
FIG. 2 is a process diagram of another method for configuring neighbor cells according to an example of the present disclosure.

FIG. 2 shows a method for configuring neighbor cells provided by an example of the present disclosure. As shown in FIG. 2, the method may be applied to a network control device, the method including:

S201, a measurement report reported by a measurement device is acquired.

The measurement report includes receiving power or receiving quality values for downlink reference signals or downlink synchronization signals or channel state reference signals of cells to be measured at the location of the measurement device.

The measurement device may be a common commercial terminal, or a drive test terminal dedicated to measure cells.

S202, a height level or range at which the measurement device is located is determined based on a height value of the location of the measurement device.

It should be noted that the height level or range may be set based on a maximum height that the measurement device can reach. For example, the measurement device may be a UAV. The current maximum flight height of the UAV can be up to 300 meters, height categories corresponding to six height levels or range are obtained based on the span of 50 meters, respectively marked as height category 1 (0-50), height category 2 (50-100), height category 3 (100-150), height category 4 (150-200), height category 5 (200-250), and height category 6 (250-300), and the height level or range at which the measurement device is located is determined based on the height value of the location of the measurement device.

S203, a cell having optimal quality of service corresponding to the height level or range at which the measurement device is located is determined based on the location of the measurement device and the receiving power or receiving quality values of the measurement device for downlink reference signals or downlink synchronization signals or channel state reference signals of cells to be measured.

The receiving quality values may be characterized by a signal-to-noise ratio.

In this step, a cell corresponding to a maximum value of the receiving power or receiving quality values of the measurement device for downlink reference signals or downlink synchronization signals or channel state reference signals of cells to be measured may be determined as the cell having optimal quality of service corresponding to the height level or range at which the measurement device is located.

For example, a receiving power or receiving quality value (a signal-to-noise ratio) of the terminal for downlink reference signals or downlink synchronization signals or channel state reference signals of cells to be measured may be sorted, and the cell corresponding to a highest receiving power or a maximum receiving quality value is selected as the cell having optimal quality of service.

S204, neighbor cells corresponding to a network device corresponding to the cell having optimal quality of service at different height levels or ranges are determined.

In this step, a neighbor cell distribution digital map may be generated based on cells having optimal quality of service corresponding to all regional locations of the same height level or height interval, and neighbor cells corresponding to the network device at the height level or range are determined based on the neighbor cell distribution digital map.

The neighbor cell distribution digital map includes a location distribution of the cells having optimal quality of service corresponding to all regional locations at a same height level or range.

Figure 3:
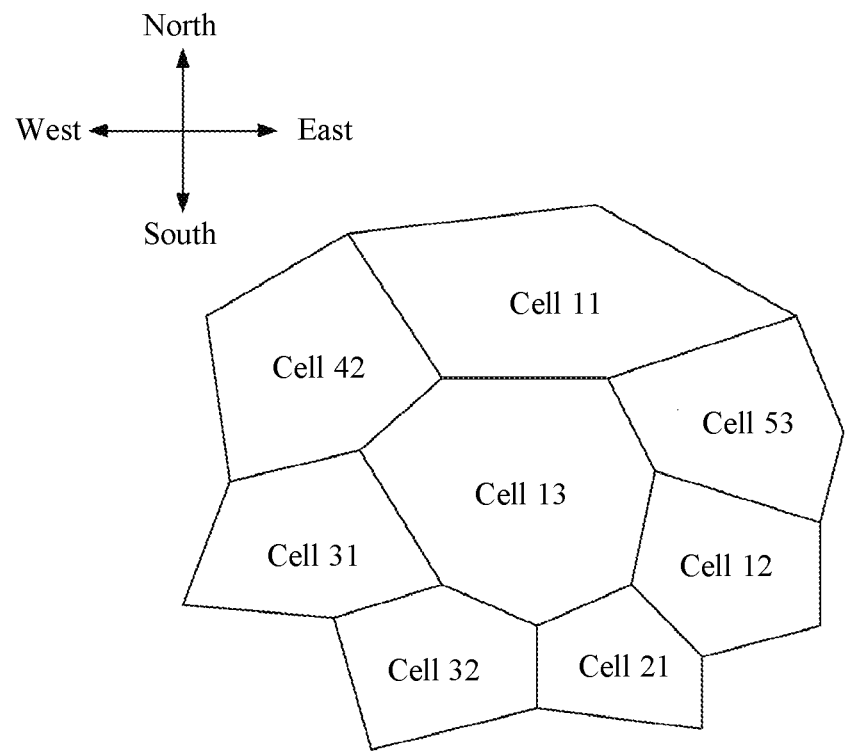
FIG. 3 is a partial schematic diagram of a neighbor cell distribution digital map according to an example of the present disclosure.

For example, as shown in FIG. 3, if the neighbor cell distribution digital map includes a base station 1, a base station 2, a base station 3, a base station 4 and a base station 5, serving cells corresponding to the base station 1 includes a cell 11, a cell 12 and a cell 13, serving cells corresponding to the base station 2 includes a cell 21, a cell 22 and a cell 23, serving cells corresponding to the base station 3 includes a cell 31, a cell 32 and a cell 33, serving cells corresponding to the base station 4 includes a cell 41, a cell 42 and a cell 43, serving cells corresponding to the base station 5 includes a cell 51, a cell 52 and a cell 53, and the cells neighboring to the cell 13 are the cell 32, the cell 31, the cell 42, the cell 11, the cell 53, the cell 12 and the cell 21, it may be determined through the cell distribution map that the neighbor cells of the cell 13 are the cell 32, the cell 31, the cell 42, the cell 11, the cell 53, the cell 12 and the cell 21, the neighbor cells of other cells are determined by the same way as the neighbor cells of the cell 13, and details are not described herein.

Optionally, the network control device may also receive a moving direction information of the terminal in the network device that is sent by the network device, and determine neighbor cells corresponding to the moving direction of the terminal based on the neighbor cell distribution digital map, and neighbor cell configuration is performed in combination with the mobility of the terminal, thereby improving the efficiency of subsequent cell selection and/or cell handover.

For example, still taking FIG. 3 as an example, if the serving cell at which the terminal is located is the cell 13, and the network control device determines that the terminal moves towards the southeast in FIG. 3, the neighbor cells to be determined can be the cell 21 and the cell 12.

In this way, the neighbor cells corresponding to the network device at different height levels or ranges may be obtained through this step.

S205, neighbor cell configuration information is sent to the network device based on the determined neighbor cells.

The neighbor cell configuration information includes neighbor cells corresponding to the network device at different height levels or ranges.

Optionally, the network control device may also send the neighbor cell distribution digital map to the network device, and the network device may also acquire the moving direction of the terminal, determine target neighbor cells corresponding to the moving direction from the neighbor cells based on the neighbor cell distribution digital map, and directly notify the terminal of the target neighbor cells.

In the above examples, the network control device configures corresponding neighbor cells based on air regions at different heights, so that the height location of the terminal is considered during neighbor cell configuration to ensure the communication quality of air services of a UAV and the like.

Figure 4:
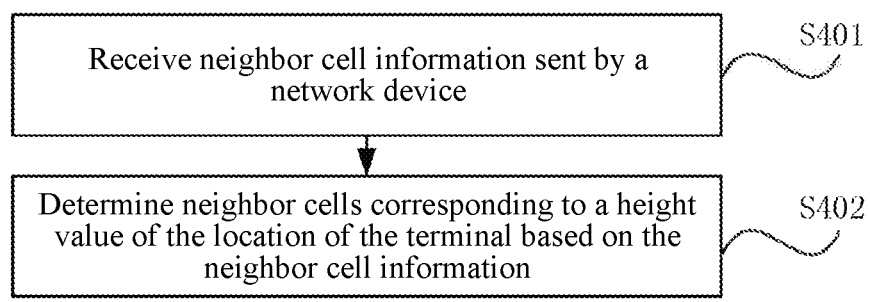
FIG. 4 is a process diagram of a third method for configuring neighbor cells according to an example of the present disclosure.

FIG. 4 shows a method for configuring neighbor cells provided by an example of the present disclosure. As shown in FIG. 4, the method is applied to a terminal, the method including:

S401, neighbor cell information sent by a network device is received.

The neighbor cell information is configured to instruct the terminal to determine neighbor cells corresponding to a height level or height interval at which the terminal is located.

In this step, for different types of terminals, the network device may send the neighbor cell information in at least one of two modes:

In the first mode, if the terminal is an idle terminal, the terminal may receive the neighbor cell information broadcast by the network device.

In the second mode, if the terminal is in a connection state, the neighbor cell information includes measurement configuration information, and the measurement configuration information includes to-be-measured cell identifiers corresponding to a height level or range at which the terminal is located, the terminal may receive the measurement configuration information sent by the network device through dedicated signaling.

In addition, the measurement configuration information may include further information such as a cycle time of measurement to be reported or a trigger event for measurement.

It should be noted that the two modes may be performed at the same time, so that different sending modes can be used for different types of terminals, or one of the modes is performed for one type of terminal. In one example, only the first mode is performed for optimizing an idle terminal. In another example, only the second mode is performed for optimizing the connected terminal. The present disclosure is not intended to be limited to the above examples.

S402, neighbor cells corresponding to a height value of the location of the terminal is determined based on the neighbor cell information.

In the above examples, the terminal determines neighbor cells corresponding to a height value of the location of the terminal based on the neighbor cell information, so that the height location of the terminal is considered during neighbor cell configuration to ensure the communication quality of air services of a UAV and the like.

Figure 5:
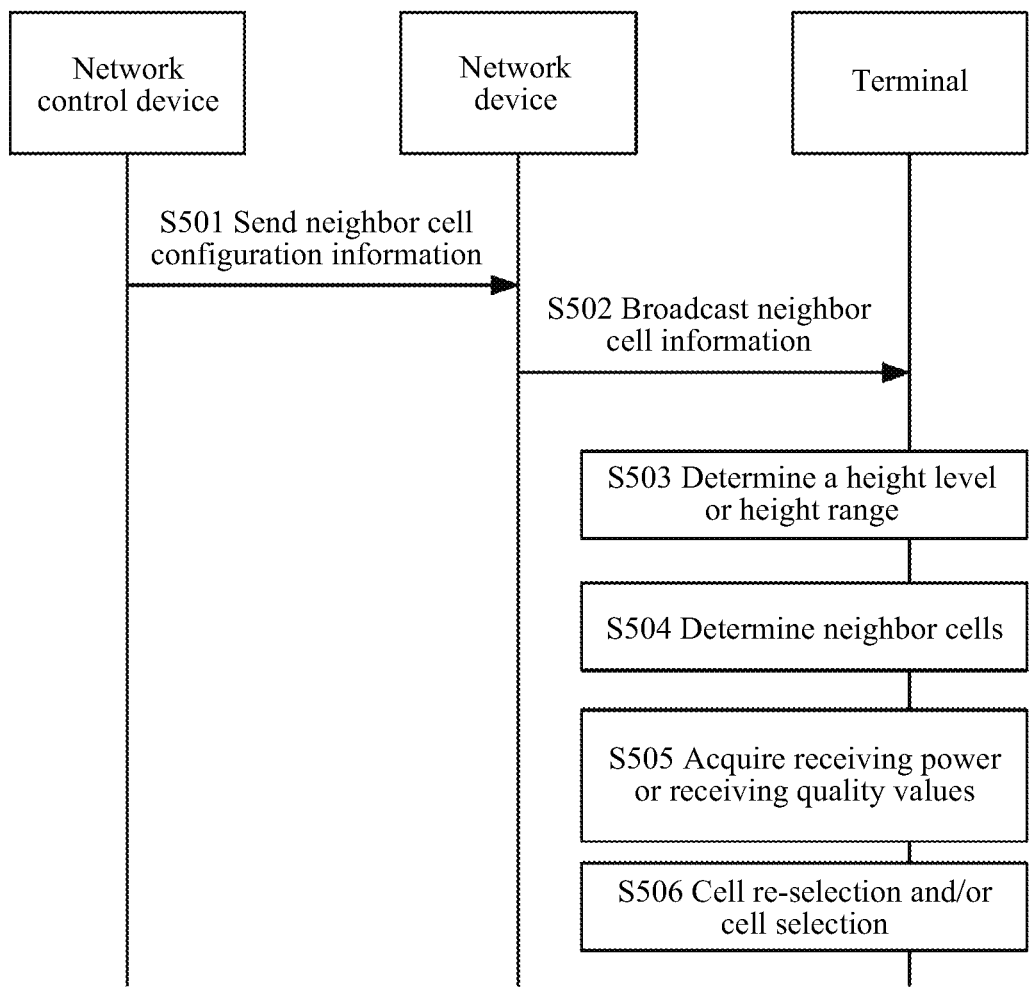
FIG. 5 is a process diagram of a fourth method for configuring neighbor cells according to an example of the present disclosure.

FIG. 5 shows a method for configuring neighbor cells provided by an example of the present disclosure. As shown in FIG. 5, the terminal of the present example is illustrated by taking an idle terminal as one example, and the method includes:

S501, a network control device sends neighbor cell configuration information to a network device.

The neighbor cell configuration information includes neighbor cells corresponding to the network device at different height levels or height ranges.

For example, the height categories corresponding to the height levels or height ranges include: a height category 1 (0-50), a height category 2 (50-100), a height category 3 (100-150), a height category 4 (150-200), a height category 5 (200-250), and a height category 6 (250-300). Corresponding neighbor cells of the terminal that are in a same horizontal distance range but within different height ranges are different.

Optionally, the neighbor cell configuration information is characterized by a sequence, and each element in the sequence corresponds to a different height level or range.

For example, the sequence in the neighbor cell configuration information includes six elements, where the element 1 corresponds to the height category 1, the element 2 corresponds to the height category 2, the element 3 corresponds to the height category 3, the element 4 corresponds to the height category 4, the element 5 corresponds to the height category 5, and the element 6 corresponds to the height category 6.

It should be noted that, before this step, the network control device needs to acquire neighbor cells corresponding to different height levels or ranges. In a possible implementation manner, the network control device acquires a measurement report reported by a measurement device, the measurement report including receiving power or receiving quality values for downlink reference signals or downlink synchronization signals or channel state reference signals of cells to be measured at the location of the measurement device; determines a height level or range at which the measurement device is located based on a height value of the location of the measurement device, and determines, based on the location of the measurement device and the receiving power or receiving quality values of the measurement device for downlink reference signals or downlink synchronization signals or channel state reference signals of to-be-measured cells, a cell having optimal quality of service corresponding to a height level or range at which the measurement device is located; determines one or more neighbor cells corresponding to the network device at different height levels or ranges, the network device corresponding to the cell having optimal quality of service, and sends neighbor cell configuration information to the network device based on the determined neighbor cells, the neighbor cell configuration information including the neighbor cells corresponding to the network device at different height levels or height intervals. For a detailed description, reference may be made to the description in the example shown in FIG. 2, and details are not described herein again.

S502, the network device determines the neighbor cell configuration information as neighbor cell information, and sends the neighbor cell information by broadcasting.

The neighbor cell information is configured to instruct the terminal to determine neighbor cells corresponding to a height level or range at which the terminal is located, and the neighbor cell information is characterized by a sequence, and each element in the sequence corresponds to a different height level or range.

Optionally, the neighbor cell information may further include a neighbor cell information selection threshold and a cell selection threshold, the neighbor cell selection threshold being configured to instruct the terminal to read corresponding neighbor cell information, and the cell selection threshold being used by the terminal to determine whether to perform cell re-selection and/or cell selection based on the cell selection threshold.

S503, the terminal receives the neighbor cell information, and determines a height level or range at which the terminal is located based on a height value of the location of the terminal.

In this step, the terminal may determine the height level or range at which the terminal is located in the following two modes:

In the first mode, the terminal may determine a height level or range at which the terminal is located based on the height value of the location.

Illustratively, taking the situation that the height categories expressed in height levels or ranges include: a height category 1 (0-50), a height category 2 (50-100), a height category 3 (100-150), a height category 4 (150-200), a height category 5 (200-250), and a height category 6 (250-300) as an example. If the current height of the terminal is 45 meters, the current height of the terminal is determined to be within the height category 1 and at a height level 1 or height range 1, a target air region is then determined based on the horizontal distance range and the height category, and so on. The height categories are only an example and are not limited.

In the second mode, when the neighbor cell information further includes a neighbor cell information selection threshold, the terminal determines a height level or range at which the terminal is located based on the height value of the location of the terminal and the neighbor cell information selection threshold.

In this mode, the height value of the location of the terminal may be compared with the neighbor cell information selection threshold, and when the height value is smaller than the neighbor cell information selection threshold, the location of the terminal is determined to be at a height level or height range corresponding to the neighbor cell information selection threshold.

Illustratively, taking six height categories including a height category 1, a height category 2, a height category 3, a height category 4, a height category 5, and a height category 6 as an example, the neighbor cell information selection threshold may be 50 meters, 100 meters, 200 meters and 250 meters. When the current height of the terminal is less than 50 meters, the height category at which the terminal is located is determined to be the height category 1. When the current height of the terminal is more than 50 meters and less than 100 meters, the height category at which the terminal is located is determined to be the height category 2, and so on.

S504, the terminal determines neighbor cells corresponding to the height value of the location of the terminal based on the neighbor cell information and the height level or height range at which the terminal is located.

In this step, neighbor cell information corresponding to the height level or height range in the neighbor cell information sent by the network device may be read.

S505, the terminal acquires receiving power or receiving quality values for downlink reference signals or downlink synchronization signals or channel state reference signals of resident cells.

The receiving quality values may be a signal-to-noise ratio.

S506, the terminal performs cell measurement on the neighbor cells based on the receiving power or receiving quality values, and performs cell re-selection and/or cell selection.

In this step, the terminal may determine, through the cell selection threshold included in the neighbor cell information, whether to perform cell re-selection and/or cell selection. In a possible implementation manner, the terminal may determine whether the receiving power or receiving quality values are smaller than or equal to the cell selection threshold, and perform cell measurement and cell selection on the neighbor cells when the receiving power or receiving quality values are smaller than or equal to the cell selection threshold.

In this way, when the receiving power or receiving quality value of the cell in which the terminal resides is lower than the cell selection threshold, that is, when the channel quality of the current resident cell is almost unable to meet the service requirement, the terminal selects another cell for residing. If the quality of the current resident cell is still good (i.e., the receiving power or receiving quality value is higher than the cell selection threshold), the cell selection is not enabled so as to reduce the power consumption of the terminal.

In the above examples, corresponding neighbor cells are determined by the height value of the location of the idle terminal, so that the height location of the idle terminal is considered during neighbor cell configuration to ensure the communication quality of air services of a UAV and the like.

It should be noted that, for the sake of simple description, the above method examples is described as a combination of a series of operations, but those skilled in the art should know that the present disclosure is not limited by the described operation sequence. In addition, those skilled in the art should also know that the above described in the specification are all examples, and the operations and modules involved are not necessarily required by the present disclosure.

Figure 6:
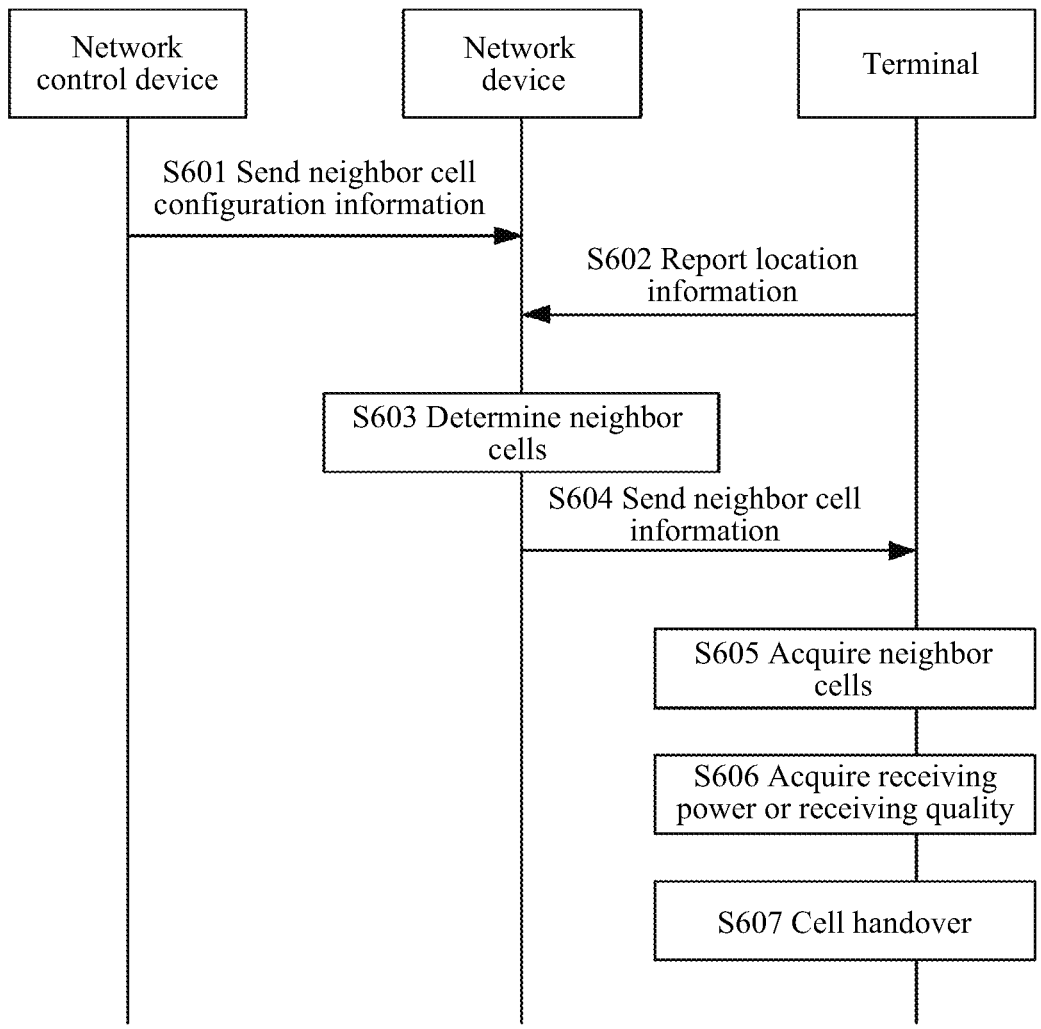
FIG. 6 is a process diagram of a fifth method for configuring neighbor cells according to an example of the present disclosure.

FIG. 6 shows a method for configuring neighbor cells provided by an example of the present disclosure. As shown in FIG. 6, the terminal of the present example is illustrated by taking a connected terminal as one example, and the method includes:

S601, a network control device sends neighbor cell configuration information to a network device.

The neighbor cell configuration information includes neighbor cells corresponding to the network device at different height levels or height ranges.

For example, the height categories corresponding to the height levels or height ranges include: a height category 1 (0-50), a height category 2 (50-100), a height category 3 (100-150), a height category 4 (150-200), a height category 5 (200-250), and a height category 6 (250-300). Corresponding neighbor cells of the terminal that are in the same horizontal distance range but within different height ranges are different.

Optionally, the neighbor cell configuration information is characterized by a sequence, and each element in the sequence corresponds to a different height level or height range.

For example, the sequence in the neighbor cell configuration information includes six elements, where the element 1 corresponds to the height category 1, the element 2 corresponds to the height category 2, the element 3 corresponds to the height category 3, the element 4 corresponds to the height category 4, the element 5 corresponds to the height category 5, and the element 6 corresponds to the height category 6.

It should be noted that, before this step, the network control device needs to acquire neighbor cells corresponding to different height levels or height ranges. In a possible implementation manner, the network control device acquires a measurement report to be reported by a measurement device, the measurement report including receiving power or receiving quality values for downlink reference signals or downlink synchronization signals or channel state reference signals of cells to be measured at the location of the measurement device; determines a height level or height range at which the measurement device is located based on a height value of the location of the measurement device, and determines, based on the location of the measurement device and the receiving power or receiving quality values of the measurement device for downlink reference signals or downlink synchronization signals or channel state reference signals of to-be-measured cells, a cell having optimal quality of service corresponding to a height level or height range at which the measurement device is located; determines corresponding neighbor cells of the network device at different height levels or height ranges, the network device having a corresponding cell with optimal quality of service, and sends neighbor cell configuration information to the network device based on the determined neighbor cells, the neighbor cell configuration information including neighbor cells corresponding to the network device at different height levels or height intervals. For a detailed description, reference may be made to the description in the embodiment shown in FIG. 2, and details are not described herein again.

S602, the terminal reports location information to the network device.

The location information includes at least a height value of the terminal.

S603, the network device determines a height level or height range at which the terminal is located based on the location information, and determines neighbor cells corresponding to the height level or height range.

In this step, the terminal may determine a height level or height range at which the terminal is located based on the height value of the location.

Illustratively, taking the situation that the height categories expressed in height levels or height ranges include: a height category 1 (0-50), a height category 2 (50-100), a height category 3 (100-150), a height category 4 (150-200), a height category 5 (200-250), and a high category 6 (250-300) as an example. If the current height of the terminal is 45 meters, the current height of the terminal is determined to be within the height category 1 and at a height level 1 or height range 1, a target air region is then determined based on the horizontal distance range and the height range, and so on. The height categories are only an example and are not limited.

S604, the network device sends neighbor cell information to the terminal in a serving cell by dedicated signaling.

The neighbor cell information includes measurement configuration information, and the measurement configuration information includes to-be-measured cell (equivalent to neighbor cell) identifiers corresponding to the height level or height range of the terminal.

Optionally, the measurement configuration information further includes a cell handover threshold, and the cell handover threshold is used by the terminal to determine, based on the cell handover threshold, whether to perform cell handover.

S605, the terminal acquires to-be-measured cell identifiers in measurement configuration information of the neighbor cell information, and determines neighbor cells based on the to-be-measured cell identifiers.

In this step, the terminal determines that the cells marked by the to-be-measured cell identifiers are neighbor cells.

S606, the terminal acquires receiving power or receiving quality values for downlink reference signals or downlink synchronization signals or channel state reference signals of resident cells.

The receiving quality values may be a signal-to-noise ratio.

S607, the terminal performs cell measurement on the neighbor cells based on the receiving power or receiving quality values, and performs cell handover.

In this step, the terminal may determine, based on the cell handover threshold included in the neighbor cell information, whether to perform cell handover. In a possible implementation manner, the terminal may determine whether the receiving power or receiving quality values are smaller than or equal to a cell selection threshold, and performs mobility measurement and cell handover on the neighbor cells when the receiving power or receiving quality values are smaller than or equal to the cell selection threshold.

In this way, when the receiving power or receiving quality value of the cell in which the terminal resides is lower than the cell handover threshold, that is, when the channel quality of the current resident cell is almost unable to meet the service requirement, the terminal selects another cell for residing. If the quality of the current resident cell is still good (i.e., the receiving power or receiving quality value is higher than the cell handover threshold), the cell handover is not enabled so as to reduce the power consumption of the terminal.

In the above examples, neighbor cells corresponding to a serving cell of the terminal are determined based on the height of the connected terminal, so that the height location of the connected terminal is considered during neighbor cell configuration to ensure the communication quality of air services of a UAV and the like.

It should be noted that, for the sake of simple description, the above method examples is described as a combination of a series of operations, but those skilled in the art should know that the present disclosure is not limited by the described operation sequence. In addition, those skilled in the art should also know that the above described in the specification are all examples, and the operations and modules involved are not necessarily required by the present disclosure.

Figure 7:
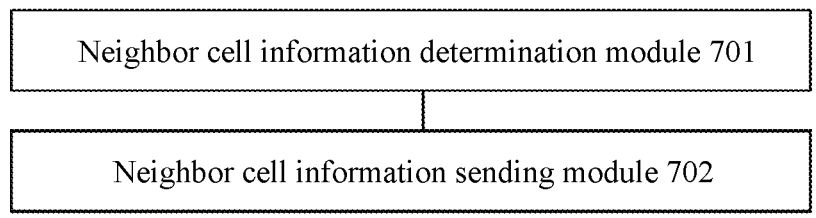
FIG. 7 is a structure diagram of an apparatus for configuring neighbor cells according to an example of the present disclosure.

FIG. 7 shows an apparatus for configuring neighbor cells provided by an example of the present disclosure. As shown in FIG. 7, the apparatus is applied to a network device, and includes:

a neighbor cell information determination module 701, configured to determine neighbor cell information; and a neighbor cell information sending module 702, configured to send the neighbor cell information to a terminal, the neighbor cell information being configured to instruct the terminal to determine neighbor cells corresponding to a height level or height range at which the terminal is located.

Figure 8:
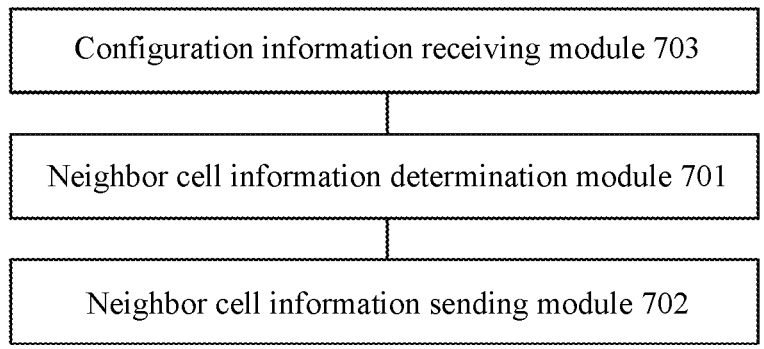
FIG. 8 is a structure diagram of another apparatus for configuring neighbor cells according to an example of the present disclosure.

Optionally, as shown in FIG. 8, the apparatus further includes:

a configuration information receiving module 703, configured to receive neighbor cell information sent by a network control device;

wherein the neighbor cell information determination module 701 is configured to determine the neighbor cell information based on the neighbor cell configuration information, the neighbor cell information being configured to instruct the terminal to determine neighbor cells corresponding to a height level or height range at which the terminal is located.

Optionally, the neighbor cell information sending module 702 is configured to send the neighbor cell information by broadcasting, so that an idle terminal determines neighbor cells corresponding to a height level or height range at which the terminal is located, and performs cell selection and/or cell re-selection; and/or, the neighbor cell information sending module 702 is configured to send the neighbor cell information to a connected terminal by dedicated signaling, the neighbor cell information including measurement configuration information, the measurement configuration information including to-be-measured cell identifiers corresponding to a height level or height range at which the terminal is located, so that the connected terminal performs mobility measurement and cell handover based on the cell identifiers to be measured.

Optionally, the neighbor cell information is characterized by a sequence, and each element in the sequence corresponds to a different height level or height range.

Optionally, if the terminal is an idle terminal, the neighbor cell information further includes a neighbor cell information selection threshold, the neighbor cell information selection threshold being configured to instruct the terminal to read corresponding neighbor cell information.

Figure 9:
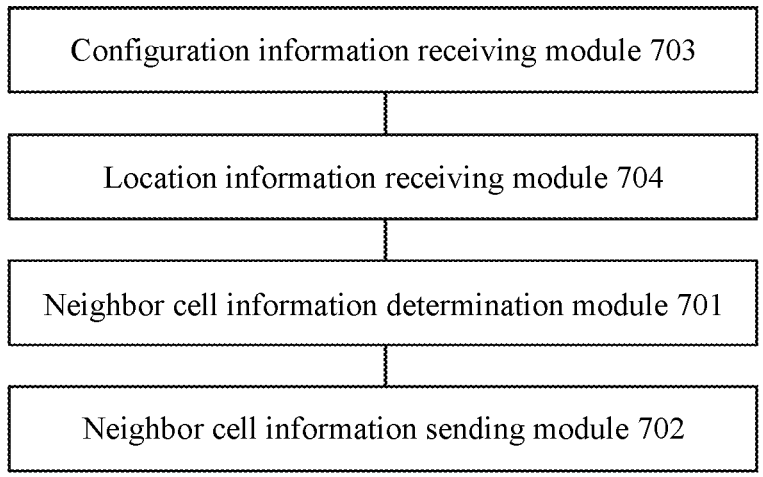
FIG. 9 is a structure diagram of a third apparatus for configuring neighbor cells according to an example of the present disclosure.

Optionally, if the terminal is a connected terminal, as shown in FIG. 9, the apparatus further includes:

a location information receiving module 704, configured to receive location information to be reported by the terminal, the location information including at least a height value corresponding to the location of the terminal;

wherein the neighbor cell information determination module 701 is configured to determine a height level or height range corresponding to the location of the terminal based on the location information, determine to-be-measured cell identifiers included in the measurement configuration information, and obtain the neighbor cell information based on the cell identifiers to be measured.

Figure 10:
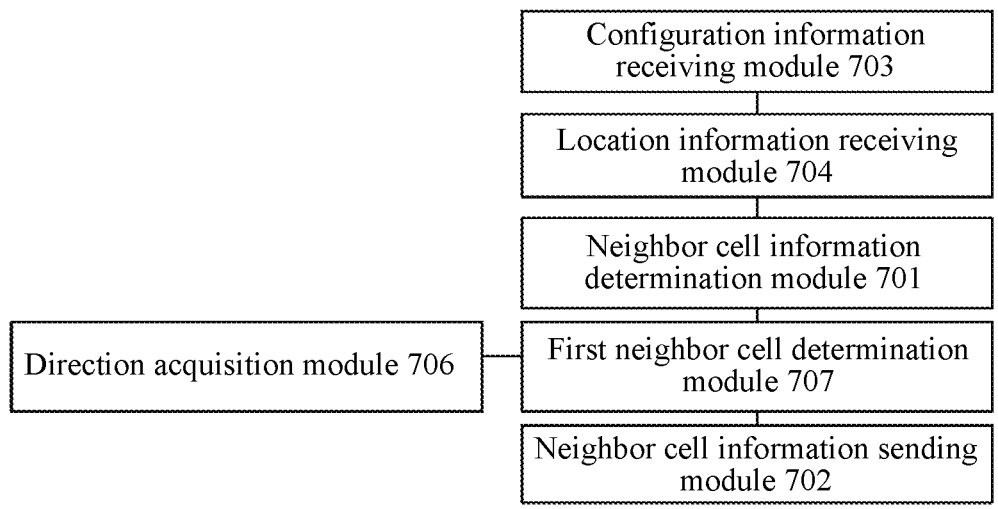
FIG. 10 is a structure diagram of a fourth apparatus for configuring neighbor cells according to an example of the present disclosure.

Optionally, as shown in FIG. 10, the apparatus further includes:

a direction acquisition module 706, configured to acquire location information and a moving direction of the terminal; and a first neighbor cell determination module 707, configured to determine target neighbor cells corresponding to the moving direction of the terminal based on the location information and moving direction of the terminal as well as the neighbor cell configuration information;

wherein the neighbor cell information sending module 702 is configured to send the neighbor cell information including the target neighbor cells to the terminal.

With the above apparatus, the neighbor cells corresponding to the height level or height range at which the terminal is located are determined, so that the height location of the terminal is considered during neighbor cell configuration to ensure the communication quality of air services of a UAV and the like.

Figure 11:
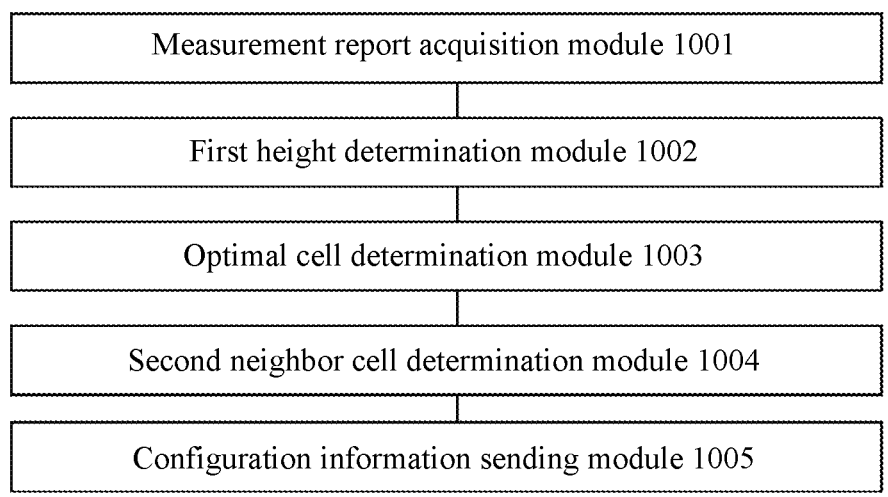
FIG. 11 is a structure diagram of a fifth apparatus for configuring neighbor cells according to an example of the present disclosure.

FIG. 11 shows an apparatus for configuring neighbor cells provided by an example of the present disclosure. As shown in FIG. 11, the apparatus is applied to a network control device, and includes:

a measurement report acquisition module 1101, configured to acquire a measurement report reported by a measurement device, the measurement report including receiving power or receiving quality values for downlink reference signals or downlink synchronization signals or channel state reference signals of cells to be measured at the location of the measurement device;

a first height determination module 1102, configured to determine a height level or height range at which the measurement device is located based on a height value of the location of the measurement device;

an optimal cell determination module 1103, configured to determine, based on the location of the measurement device and the receiving power or receiving quality values of the measurement device for downlink reference signals or downlink synchronization signals or channel state reference signals of to-be-measured cells, a cell having optimal quality of service corresponding to the height level or height range at which the measurement device is located;

a second neighbor cell determination module 1104, configured to determine neighbor cells corresponding to the network device corresponding to the cell having optimal quality of service at different height levels or height ranges; and a configuration information sending module 1105, configured to send neighbor cell configuration information to the network device based on the determined neighbor cells, the neighbor cell configuration information including neighbor cells corresponding to the network device at different height levels or height ranges.

Optionally, the optimal cell determination module 1103 is configured to determine the cell corresponding to the maximum value of the receiving power or receiving quality values of the measurement device for downlink reference signals or downlink synchronization signals or channel state reference signals of to-be-measured cells as a cell having optimal quality of service corresponding to the height level or height range at which the measurement device is located.

Optionally, the second neighbor cell determination module 1104 is configured to generate a neighbor cell distribution digital map based on cells having optimal quality of service corresponding to all regional locations of the same height level or height range, and to determine neighbor cells corresponding to the network device at the height level or height range based on the neighbor cell distribution digital map, the neighbor cell distribution digital map including a location distribution of the cells having optimal quality of service corresponding to all regional locations at the same height level or height range.

Optionally, the apparatus further includes: a direction receiving module, configured to receive a moving direction of the terminal in the network device sent by the network device;

wherein the second neighbor cell determination module 1104 is configured to determine neighbor cells corresponding to the moving direction of the terminal based on the neighbor cell distribution digital map.

With the above apparatus, the network control device configures corresponding neighbor cells based on air regions of different heights, so that the height location of the terminal is considered during neighbor cell configuration to ensure the communication quality of air services of a UAV and the like.

Figures 12, 13:
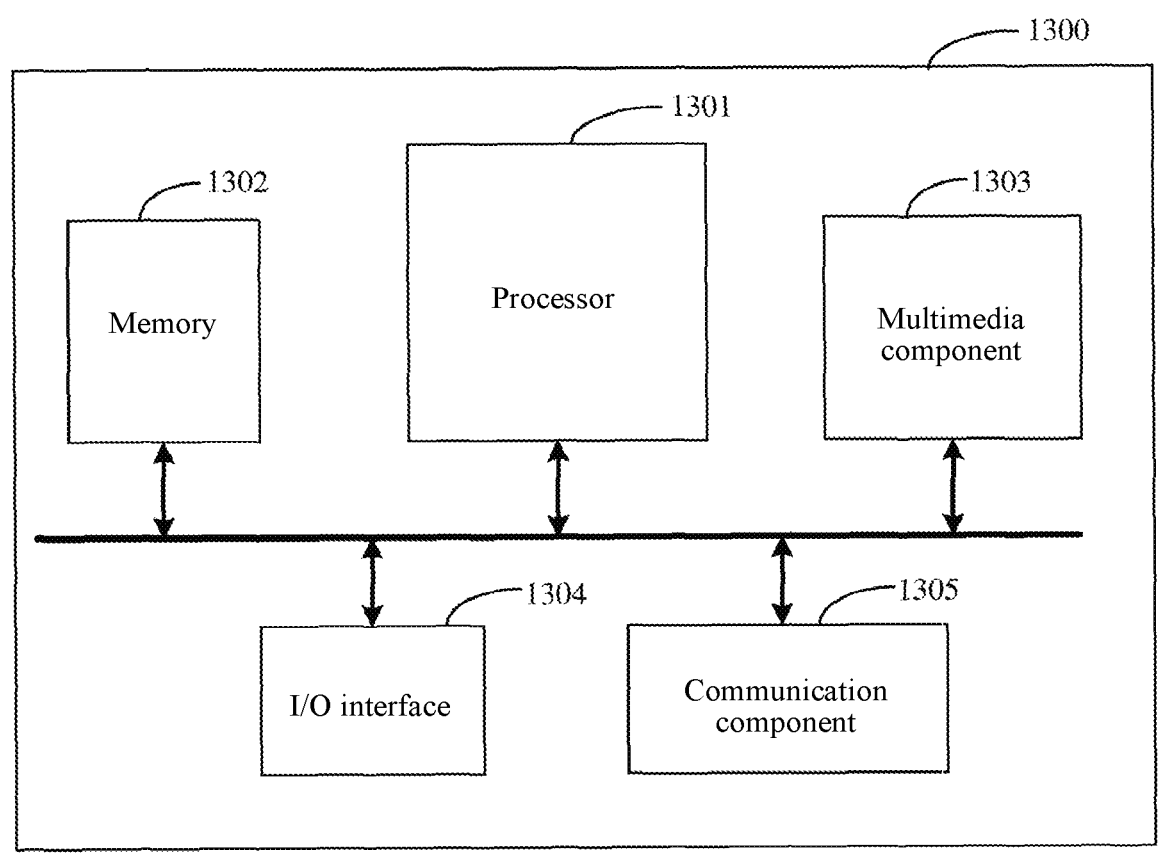
FIG. 12 is a structure diagram of a sixth apparatus for configuring neighbor cells according to an example of the present disclosure.
FIG. 13 is a hardware structure diagram of an apparatus for configuring neighbor cells according to an example of the present disclosure.

FIG. 12 shows an apparatus for configuring neighbor cells provided by an example of the present disclosure. As shown in FIG. 12, the apparatus is applied to a terminal, and includes:

a neighbor cell information receiving module 1201, configured to receive neighbor cell information sent by a network device, the neighbor cell information being configured to instruct the terminal to determine neighbor cells corresponding to a height level or height range at which the terminal is located; and a third neighbor cell determination module 1202, configured to determine neighbor cells corresponding to a height value of the location of the terminal based on the neighbor cell information.

Optionally, when the terminal is an idle terminal, the apparatus further includes:

a second height determination module, configured to determine a height level or height range at which the terminal is located based on the height value of the location of the terminal;

wherein the third neighbor cell determination module 1202 is configured to determine neighbor cells corresponding to the height value of the location of the terminal based on the neighbor cell information and the height level or height range at which the terminal is located.

Optionally, the neighbor cell information further includes a neighbor cell information selection threshold, the neighbor cell information selection threshold being configured to instruct the terminal to read corresponding neighbor cell information;

the third neighbor cell determination module 1202 is configured to determine a height level or height range at which the terminal is located based on the height value of the location of the terminal and the neighbor cell information selection threshold, and read neighbor cell information corresponding to the height level or height range in the neighbor cell information sent by the network device.

Optionally, the second height determination module is configured to compare the height value of the location of the terminal with the neighbor cell information selection threshold, and determine, when the height value is smaller than the neighbor cell information selection threshold, the location of the terminal at a height level or height interval corresponding to the neighbor cell information selection threshold.

Optionally, when the terminal is in a connection state, the neighbor cell information includes measurement configuration information, and the measurement configuration information includes to-be-measured cell identifiers corresponding to the height level or height range at which the terminal is located;

the neighbor cell information receiving module 1201 is configured to receive measurement configuration information sent by the network device through dedicated signaling based on the neighbor cell configuration information.

Optionally, the apparatus further includes:

a location information report module, configured to report location information of the terminal to the network device, the location information at least including a current height value of the terminal, so that the network device determines a height level or height range at which the terminal is located based on the location information, and determines neighbor cells corresponding to the height level or height range;

wherein the third neighbor cell determination module 1202 is configured to acquire to-be-measured cell identifiers in the measurement configuration information, and determine neighbor cells based on the to-be-measured cell identifiers.

With the above apparatus, the terminal determines the neighbor cells corresponding to a current height based on the neighbor cell information, so that the height location of the terminal is considered during neighbor cell configuration to ensure the communication quality of air services of a UAV and the like.

Those skilled in the art may clearly understand that, for the purpose of convenience and briefness in description, for the specific operating process and description of the apparatus, reference may be made to the corresponding process in the aforementioned method embodiment, and details are not described here.

FIG. 13 is a block diagram of an apparatus for configuring neighbor cells provided by an example of the present disclosure. As shown in FIG. 13, the apparatus 1300 may be a network device, a network control device or a terminal. The apparatus 1300 may include: a processor 1301, a memory 1302, a multimedia component 1303, an input/output (I/O) interface 1304, and a communication component 1305.

The processor 1301 is configured to control the overall operation of the apparatus 1300 to complete all of or part of steps of the method for configuring neighbor cells. The memory 1302 is configured to store various types of data to support operations at the apparatus 1300. The data may include, for example, instructions of any application or method operated on the apparatus 1300, as well as application related data, such as contact data, received and transmitted messages, pictures, audio, and video.

The memory 1302 may be implemented by any type of volatile or non-volatile storage terminal device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk. The multimedia component 1303 may include a screen and an audio component. The screen may be, for example, a touch screen, and the audio component is configured to output and/or input audio signals. For example, the audio component may include a microphone for receiving external audio signals. The received audio signals may be further stored in the memory 1302 or sent by the communication component 1305. The audio component further includes at least one speaker for outputting audio signals. The I/O interface 1304 provides an interface between the processor 1301 and other interface module which may be a keyboard, a mouse, a button, or the like. These buttons may be virtual buttons or physical buttons. The communication component 1305 is used for performing wired or wireless communication between the apparatus 1300 and other terminal device. For the wireless communication, such as Wi-Fi, Bluetooth, Near Field Communication (NFC), 2G, 3G or 4G, or a combination of one or more of them, the corresponding communication component 1305 may include: a Wi-Fi module, a Bluetooth module, or an NFC module.

In an example, the apparatus 1300 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors or other electronic components to execute the method for configuring neighbor cells.

The examples of the present disclosure further provide a computer readable storage medium 2 including one or more programs for executing a method for configuring neighbor cells, the method including: determining neighbor cell information, and sending the neighbor cell information to a terminal, the neighbor cell information being used to instruct the terminal to determine neighbor cells corresponding to a height level or height interval at which the terminal is located.

Optionally, the step of sending the neighbor cell information to a terminal based on neighbor cell configuration information includes: sending the neighbor cell information by broadcasting, so that an idle terminal determines neighbor cells corresponding to a height level or height range at which the terminal is located, and performs cell selection and/or cell re-selection; and/or sending the neighbor cell information to a connected terminal by dedicated signaling, the neighbor cell information including measurement configuration information, the measurement configuration information including to-be-measured cell identifiers corresponding to the height level or height range at which the terminal is located, so that the connected terminal performs mobility measurement and cell handover based on the to-be-measured cell identifiers.

Optionally, the neighbor cell information further includes a neighbor cell information selection threshold, the neighbor cell information selection threshold being configured to instruct the terminal to read corresponding neighbor cell information.

Optionally, the neighbor cell information is characterized by a sequence, and each element in the sequence corresponds to a different height level or height range.

Optionally, if the terminal is in a connection state, before sending the measurement configuration information to the connected terminal, the method further includes: receiving location information reported by the terminal, the location information at least including a height value corresponding to the location of the terminal; determining a height level or range corresponding to the location of the terminal based on the location information, and determining to-be-measured cell identifiers included in the measurement configuration information.

Optionally, the step of determining neighbor cell information includes: receiving neighbor cell configuration information sent by a network control device, and determining the neighbor cell information based on the neighbor cell configuration information, the neighbor cell configuration information including neighbor cells corresponding to the network device at different height levels or ranges.

Optionally, before receiving the neighbor cell configuration information sent by the network control device, the method further includes: acquiring location information and a moving direction of the terminal, determining target neighbor cells corresponding to the moving direction of the terminal based on the location information and moving direction of the terminal as well as the neighbor cell configuration information, and sending the neighbor cell information including the target neighbor cells to the terminal.

The present disclosure further provides a network device, the device including the computer readable storage medium 1; and one or more processors for executing the programs in the computer readable storage medium 1.

The examples of the present disclosure further provides a computer readable storage medium 1 including one or more programs for executing a method for configuring neighbor cells, before determining neighbor cell information, the method further including: receiving neighbor cell configuration information sent by a network control device, the neighbor cell configuration information including neighbor cells corresponding to the network device at different height levels or height intervals; and the step of determining neighbor cell information includes: determining the neighbor cell information based on the neighbor cell configuration information.

Optionally, the step of sending the neighbor cell information to a terminal includes: sending the neighbor cell information by broadcasting, so that an idle terminal determines neighbor cells corresponding to a height level or height range at which the terminal is located, and performs cell selection and/or cell re-selection; and/or sending the neighbor cell information to a connected terminal by dedicated signaling, the neighbor cell information including measurement configuration information, the measurement configuration information including to-be-measured cell identifiers corresponding to the height level or height range at which the terminal is located, so that the connected terminal performs mobility measurement and cell handover based on the to-be-measured cell identifiers.

Optionally, the neighbor cell configuration information is characterized by a sequence, and each element in the sequence corresponds to a different height level or height range.

Optionally, if the terminal is an idle terminal, the neighbor cell information further includes a neighbor cell information selection threshold, the neighbor cell information selection threshold being used to instruct the terminal to read corresponding neighbor cell information.

Optionally, if the terminal is a connected terminal, before the step of determining the neighbor cell information based on the neighbor cell configuration information, the method further includes: receiving location information reported by the terminal, the location information at least including a height value corresponding to the location of the terminal; and the step of determining neighbor cell information based on the neighbor cell configuration information includes: determining a height level or height range corresponding to the location of the terminal based on the location information, determining to-be-measured cell identifiers included in the measurement configuration information, and obtaining the neighbor cell information based on the to-be-measured cell identifiers.

Optionally, before the step of receiving the neighbor cell configuration information sent by a network control device, the method further includes: acquiring location information and a moving direction of the terminal, and determining target neighbor cells corresponding to the moving direction of the terminal based on the location information and moving direction of the terminal as well as the neighbor cell configuration information; and the step of sending the neighbor cell information to a terminal based on the neighbor cell configuration information includes: sending the neighbor cell information including the target neighbor cells to the terminal.

The present disclosure further provides a network control device, the device including the computer readable storage medium 2; and one or more processors for executing the programs in the computer readable storage medium 2.

The examples of the present disclosure further provide a computer readable storage medium 3 including one or more programs for executing a method for configuring neighbor cells, the method including: receiving neighbor cell information sent by a network device, the neighbor cell information being configured to instruct the terminal to determine neighbor cells corresponding to a height level or height range at which the terminal is located; and determining the neighbor cells corresponding to a height value of the location of the terminal based on the neighbor cell information.

Optionally, when the terminal is an idle terminal, before determining the neighbor cells corresponding to the height value of the location of the terminal based on the neighbor cell information, the method further includes: determining a height level or height range at which the terminal is located based on the height value of the location of the terminal; and the step of determining neighbor cells corresponding to a height value of the location of the terminal based on the neighbor cell information includes: determining the neighbor cells corresponding to the height value of the location of the terminal based on the neighbor cell information and the height level or height range at which the terminal is located.

Optionally, the neighbor cell information further includes a neighbor cell information selection threshold, the neighbor cell information selection threshold being configured to instruct the terminal to read corresponding neighbor cell information; and the step of determining neighbor cells corresponding to the location of the terminal based on the height level or height range at which the terminal is located and the neighbor cell information includes: determining a height level or height range at which the terminal is located based on the height value of the location of the terminal and the neighbor cell information selection threshold, and reading neighbor cell information corresponding to the height level or height range in the neighbor cell information sent by the network device.

Optionally, the step of determining a height level or height range at which the terminal is located based on the height value of the location of the terminal and the neighbor cell information selection threshold includes: comparing the height value of the location of the terminal with the neighbor cell information selection threshold, and determining, when the height value is smaller than the neighbor cell information selection threshold, the location of the terminal at a height level or height range corresponding to the neighbor cell information selection threshold.

Optionally, when the terminal is a connected terminal, the neighbor cell information includes measurement configuration information, the measurement configuration information including to-be-measured cell identifiers corresponding to a height level or height range at which the terminal is located; and the step of receiving neighbor cell information sent by a network device includes: receiving measurement configuration information sent by a network device through dedicated signaling based on the neighbor cell configuration information.

Optionally, before receiving the neighbor cell information sent by the network device, the method further includes: reporting location information of a terminal to a network device, the location information at least including a height value of the terminal, so that the network device determines a height level or height range at which the terminal is located based on the location information, and determines neighbor cells corresponding to the height level or height range; and the step of determining neighbor cells corresponding to a height value of the location of the terminal based on the neighbor cell information includes: acquiring to-be-measured cell identifiers in the measurement configuration information, and determining the neighbor cells based on the to-be-measured cell identifiers.

The present disclosure further provides a terminal including computer readable storage medium 3; and one or more processors for executing the programs in the computer readable storage medium 3.

The preferred embodiments of the present disclosure have been described in details above with reference to the accompanying drawings. However, the present disclosure is not limited to the specific details in the above examples. Various simple variations may be made to the technical solutions of the present disclosure within the scope of the technical idea of the present disclosure, and these simple variations fall within the scope of the present disclosure.

It should be further noted that the specific technical features described in the foregoing specific implementation manners can be combined in any appropriate manner as long as no conflict occurs. To avoid unnecessary repetition, various possible combination manners will not be described in the present disclosure.

In addition, various different implementation manners of the present disclosure may also be combined arbitrarily. Such combinations shall also be considered as the content disclosed by the present disclosure as long as these combinations do not depart from the concept of the present disclosure.

What is claimed is:

1. A method for configuring neighbor cells, applied to a network device, comprising:
   receiving neighbor cell configuration information sent by a network control device, the neighbor cell configuration information comprising neighbor cells corresponding to the network device at different height levels or height ranges;
   determining neighbor cell information based on the neighbor cell configuration information; and
   sending the neighbor cell information to a terminal, the neighbor cell information being configured to instruct the terminal to determine neighbor cells corresponding to a height level or height range at which the terminal is located,
   wherein, the neighbor cell configuration information is characterized by a sequence, and each element in the sequence corresponds to a different height level or height range.

2. The method according to claim 1, wherein the step of sending the neighbor cell information to a terminal comprises:
   sending the neighbor cell information by broadcasting, so that an idle terminal determines neighbor cells corresponding to a height level or height range at which the terminal is located, and performs cell selection and/or cell re-selection.

3. The method according to claim 1, wherein the step of sending the neighbor cell information to a terminal comprises:
   sending the neighbor cell information to a connected terminal by dedicated signaling, the neighbor cell information comprising measurement configuration information, the measurement configuration information comprising to-be-measured cell identifiers corresponding to the height level or height range at which the terminal is located, so that the connected terminal performs mobility measurement and cell handover based on the cell identifiers to be measured.

4. The method according to claim 1, wherein if the terminal is an idle terminal, the neighbor cell information further comprises a neighbor cell information selection threshold, the neighbor cell information selection threshold being configured to instruct the terminal to read corresponding neighbor cell information.

5. The method according to claim 1, wherein if the terminal is a connected terminal, before determining the neighbor cell information based on the neighbor cell configuration information, the method further comprises:
   receiving location information reported by the terminal, the location information at least comprising a height value corresponding to the location of the terminal;
   the step of determining the neighbor cell information based on the neighbor cell configuration information comprises:
   determining a height level or height range corresponding to the location of the terminal based on the location information;
   determining to-be-measured cell identifiers included in a measurement configuration information, and obtaining the neighbor cell information based on the cell identifiers to be measured.

6. The method according to claim 5, wherein before receiving the neighbor cell configuration information sent by the network control device, the method further comprises:
   acquiring location information and a moving direction of the terminal; and
   determining target neighbor cells corresponding to the moving direction of the terminal based on the location information and the moving direction of the terminal as well as the neighbor cell configuration information;
   wherein the step of sending the neighbor cell information to the terminal based on the neighbor cell configuration information comprises:
   sending the neighbor cell information comprising the target neighbor cells to the terminal.

7. A method for configuring neighbor cells, applied to a network control device, comprising:
   acquiring a measurement report reported by a measurement device, the measurement report comprising receiving power or receiving quality values for downlink reference signals or downlink synchronization signals or channel state reference signals of to-be-measured cells at a location of the measurement device;
   determining a height level or height range at which the measurement device is located based on a height value of the location of the measurement device;
   determining, based on the location of the measurement device and the receiving power or receiving quality values of the measurement device for downlink reference signals or downlink synchronization signals or channel state reference signals of to-be-measured cells, a cell having optimal quality of service corresponding to the height level or height range at which the measurement device is located;
   determining neighbor cells corresponding to a network device corresponding to the cell having optimal quality of service at different height levels or height ranges; and
   sending neighbor cell configuration information to the network device based on the determined neighbor cells, the neighbor cell configuration information comprising neighbor cells corresponding to the network device at different height levels or height ranges, wherein, the neighbor cell configuration information is characterized by a sequence, and each element in the sequence corresponds to a different height level or height range.

8. The method according to claim 7, wherein the step of determining the cell having optimal quality of service corresponding to the height level or height range at which the measurement device is located based on the location of the measurement device and the receiving power or receiving quality values of the measurement device for downlink reference signals or downlink synchronization signals or channel state reference signals of cells to be measured comprises:

determining a cell corresponding to the maximum value of the receiving power or receiving quality values of the measurement device for downlink reference signals or downlink synchronization signals or channel state reference signals of cells to be measured as the cell having optimal quality of service corresponding to the height level or height range at which the measurement device is located.

9. The method according to claim 7, wherein the step of determining the neighbor cells corresponding to the network device corresponding to the cell having optimal quality of service at different height levels or height ranges comprises:
generating a neighbor cell distribution digital map based on cells having optimal quality of service corresponding to all regional locations of the same height level or height range, the neighbor cell distribution digital map comprising a location distribution of cells having optimal quality of service corresponding to all regional locations at the same height level or height range; and
determining the neighbor cells corresponding to the network device at the height level or height range based on the neighbor cell distribution digital map.

10. The method according to claim 9, wherein before determining the neighbor cells corresponding to the network device at the height level or height range based on the neighbor cell distribution digital map, the method further comprises:
receiving a moving direction of a terminal in the network device sent by the network device;
wherein the step of determining the neighbor cells corresponding to the network device at the height level or height range based on the neighbor cell distribution digital map comprises:
determining neighbor cells corresponding to the moving direction of the terminal based on the neighbor cell distribution digital map.

11. An apparatus for configuring neighbor cells, applied to a network device, comprising:
one or more processors;
a computer readable storage medium having computer readable instructions which, when executed by the one or more processors, cause the one or more processors to:
receive neighbor cell configuration information sent by a network control device, the neighbor cell configuration information comprising neighbor cells corresponding to the network device at different height levels or height ranges;
determine neighbor cell information based on the neighbor cell configuration information; and
send the neighbor cell information to a terminal, the neighbor cell information being configured to instruct the terminal to determine neighbor cells corresponding to a height level or height range at which the terminal is located, wherein, the neighbor cell configuration information is characterized by a sequence, and each element in the sequence corresponds to a different height level or height range.

12. The apparatus according to claim 11, wherein to send the neighbor cell information to a terminal, the computer readable instructions further cause the one or more processors to send the neighbor cell information by broadcasting, so that an idle terminal determines neighbor cells corresponding to a height level or height range at which the terminal is located, and performs cell selection and/or cell re-selection.

13. The apparatus according to claim 11, wherein to send the neighbor cell information to a terminal, the computer readable instructions cause the one or more processors to:
send the neighbor cell information to a connected terminal by dedicated signaling, the neighbor cell information comprising measurement configuration information, the measurement configuration information comprising to-be-measured cell identifiers corresponding to the height level or height range at which the terminal is located, so that the connected terminal performs mobility measurement and cell handover based on the cell identifiers to be measured.

14. The apparatus according to claim 11, wherein if the terminal is an idle terminal, the neighbor cell information further comprises a neighbor cell information selection threshold, the neighbor cell information selection threshold being configured to instruct the terminal to read corresponding neighbor cell information.

15. The apparatus according to claim 11, wherein if the terminal is a connected terminal, before to determine the neighbor cell information based on the neighbor cell configuration information, the computer readable instructions cause the one or more processors to:
receive location information reported by the terminal, the location information at least comprising a height value corresponding to the location of the terminal;
wherein to determine the neighbor cell information based on the neighbor cell configuration information, the computer readable instructions cause the one or more processors to:
determine a height level or height range corresponding to the location of the terminal based on the location information;
determine to-be-measured cell identifiers included in measurement configuration information, and obtaining the neighbor cell information based on the cell identifiers to be measured.

16. The apparatus according to claim 15, wherein before to receive the neighbor cell configuration information sent by the network control device, the computer readable instructions cause the one or more processors to:
acquire location information and a moving direction of the terminal; and
determine target neighbor cells corresponding to the moving direction of the terminal based on the location information and the moving direction of the terminal as well as the neighbor cell configuration information;
wherein to send the neighbor cell information to the terminal based on the neighbor cell configuration information the computer readable instructions cause the one or more processors to:
send the neighbor cell information comprising the target neighbor cells to the terminal.

* * * * *